(12) United States Patent
Fawcett et al.

(10) Patent No.: US 11,048,682 B2
(45) Date of Patent: *Jun. 29, 2021

(54) CUSTOM LIGHTNING CONNECT ADAPTER FOR GOOGLE SHEETS WEB-BASED SPREADSHEET PROGRAM

(71) Applicant: FinancialForce.com, Inc., San Francisco, CA (US)

(72) Inventors: Andrew Fawcett, Harrogate (GB); Maria Augustina García Peralta, Munguia (ES)

(73) Assignee: FinancialForce.com, Inc., San Francisco, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/418,928

(22) Filed: May 21, 2019

(65) Prior Publication Data

US 2019/0272266 A1    Sep. 5, 2019

Related U.S. Application Data

(63) Continuation of application No. 15/161,142, filed on May 20, 2016, now Pat. No. 10,303,675.

(51) Int. Cl.
*G06F 16/23* (2019.01)
*G06F 16/245* (2019.01)
(Continued)

(52) U.S. Cl.
CPC ............ *G06F 16/23* (2019.01); *G06F 16/245* (2019.01); *G06F 16/258* (2019.01); *G06F 40/18* (2020.01); *G06F 40/197* (2020.01)

(58) Field of Classification Search
None
See application file for complete search history.

(56) References Cited

U.S. PATENT DOCUMENTS

| | | | |
|---|---|---|---|
| 7,325,109 B1 * | 1/2008 | Muppalaneni | G06F 11/2082 707/999.104 |
| 8,195,770 B1 * | 6/2012 | Aral | G06F 11/2064 709/219 |

(Continued)

OTHER PUBLICATIONS

Saleforce, "Force.com Apex Code Developer's Guide", 2015, all pages. (Year: 2015).*

(Continued)

*Primary Examiner* — Son T Hoang
(74) *Attorney, Agent, or Firm* — Kokka & Backus, PC

(57) ABSTRACT

Various embodiments concern custom adapters for Salesforce platforms that enable synchronization with an external service, such as Google Sheets. More specifically, the custom adapters can be used to read external data from a database associated with the external service, and then continually reference the external data in order to provide a live view of the external data from a Salesforce interface. Thus, the custom adapters enable real-time, live data integration without data replication. The custom adapters also allow the external data to be dynamically mapped to data object(s) that are used to create the Salesforce interface. Therefore, a user may be able to modify the external data using the Salesforce interface and an interface associated with the external service.

17 Claims, 7 Drawing Sheets

(51) Int. Cl.
*G06F 16/25* (2019.01)
*G06F 40/18* (2020.01)
*G06F 40/197* (2020.01)

(56) References Cited

U.S. PATENT DOCUMENTS

| | | | | |
|---|---|---|---|---|
| 10,152,499 | B1* | 12/2018 | Wilton | G06F 16/219 |
| 2004/0243794 | A1* | 12/2004 | Mackin | G06F 16/23 |
| 2011/0016180 | A1 | 1/2011 | Bharadhwaj et al. | |
| 2015/0026075 | A1* | 1/2015 | Mondri | G06F 16/27 |

OTHER PUBLICATIONS

Salesforce II, ("Magical External Objects: Seamless Integration is Here", 2014, https://www.youtube.com/watch?v=GGvCcuTbhZ, all pages (Year: 2014).*

Salesforce, "Force.com Apex Code Developer's Guide", 2015, all pages. (Year: 2015), 2015, 2505 pages.

Salesforce II, ("Magical External Objects: Seamless Integration is Here", 2014, https://www.youtube.com/watch?v=GGvCcuTbhZ, all pages. (Year: 2014), 2014, 6 pages.

* cited by examiner

500

501
Access a programming environment

502
Call an API to an external service from within the programming environment

503
Parse external data made accessible by the API

504
Format the external data

505
Establish relationship between external data and data object(s) used within the programming environment

506
Dynamically map external data to the data object(s)

507
Continually reference external data and data object(s) to synchronize external service and Salesforce platform

601
Receive input indicative of a request to change an external data record

602
Analyze a mapping of data object(s) to external data records of an external service

603
Identify external data record and corresponding data object

604
Transmit metadata to the external service via an API

605
Cause the external service to update the external data record based on the metadata

606
Automatically synchronize the external data records in real time

FIG. 6

CUSTOM LIGHTNING CONNECT ADAPTER FOR GOOGLE SHEETS WEB-BASED SPREADSHEET PROGRAM

CROSS-REFERENCE TO RELATED APPLICATIONS

This application is a continuation of U.S. application Ser. No. 15/161,142, filed on May 20, 2016, the contents of which are incorporated herein by reference in its entirety.

RELATED FIELD

Various embodiments relate generally to techniques for synchronizing data in real time and, more specifically, to custom adapters for integrating a Salesforce platform and an external service.

BACKGROUND

Salesforce is a cloud computing company that offers various customer relationship management (CRM) products and social enterprise (e.g., social networking) solutions. Companies offering CRM services, such as Salesforce, can provide entities with an interface for case management and task management, as well as a system for automatically routing and escalating important events. The Salesforce platform also enables individual customers to track their own cases. In some instances, the Salesforce platform includes a social networking add-on application (also referred to as a "plug-in") that allows the Salesforce platform to read conversations on social networking websites, analyze emails, chat messages, search engine queries, etc.

Force.com®, meanwhile, is a platform as a service (PaaS) that allows developers to create add-on applications that can be integrated into the Salesforce platform. Force.com® applications are hosted on the architecture of the Salesforce platform and are typically built using Apex, which is a proprietary Java-like programming language.

When developing an add-on application for the Salesforce platform, it is often desirable to link to external services and external sources of data. For example, a developer may wish to integrate data that is stored in an enterprise resource planning (ERP) system. Data integration is particularly important when the customer for whom the add-on application is being developed still uses data sources that are external to the Salesforce platform (e.g., on-premises storage or a cloud-based storage service).

Traditionally, data has been exported to and imported from these external sources. However, there is often significant lag between when a user modifies the data via a Salesforce interface and when the modification is reflected in the external source. Moreover, users are typically required to manually invoke data synchronization. These issues can cause significant problems, particular in fast-paced or multi-tenant environments where it is desirable to have the data be synchronized as close to real time as possible.

SUMMARY

Systems and techniques for implementing custom adapters for the Salesforce platform are described herein. More specifically, custom adapters for Lightning Connect can be implemented that allow a Salesforce platform to be synchronized with an external service. Lightning Connect (also referred to as "Salesforce Connect") is a feature of the Salesforce platform that allows data objects used by the Salesforce platform to be mapped to data tables in external systems. Rather than copy external data from the external system to the Salesforce platform, the custom adapters for Lightning Connect can access and read external data maintained by the external service without replicating the data.

The custom adapters can also dynamically map the external data to one or more data objects that are used by the Salesforce platform to create a Salesforce interface. Moreover, the custom adapters can continually reference the external data so that the Salesforce interface can provide a live view of the external data. Such a configuration allows users of the Salesforce interview to view changes that have been made to the external data (e.g., using an external service interface) in near real time.

BRIEF DESCRIPTION OF THE DRAWINGS

One or more embodiments of the present invention are illustrated by way of example and not limitation in the figures of the accompanying drawings, in which like references indicate similar elements.

FIG. 5 depicts a process for implementing a custom Lightning Connect adapter for a Salesforce platform.

FIG. 6 depicts a process for synchronizing a Salesforce interface and an external interface (e.g., a Google Sheets interface).

DETAILED DESCRIPTION

Figure 1:
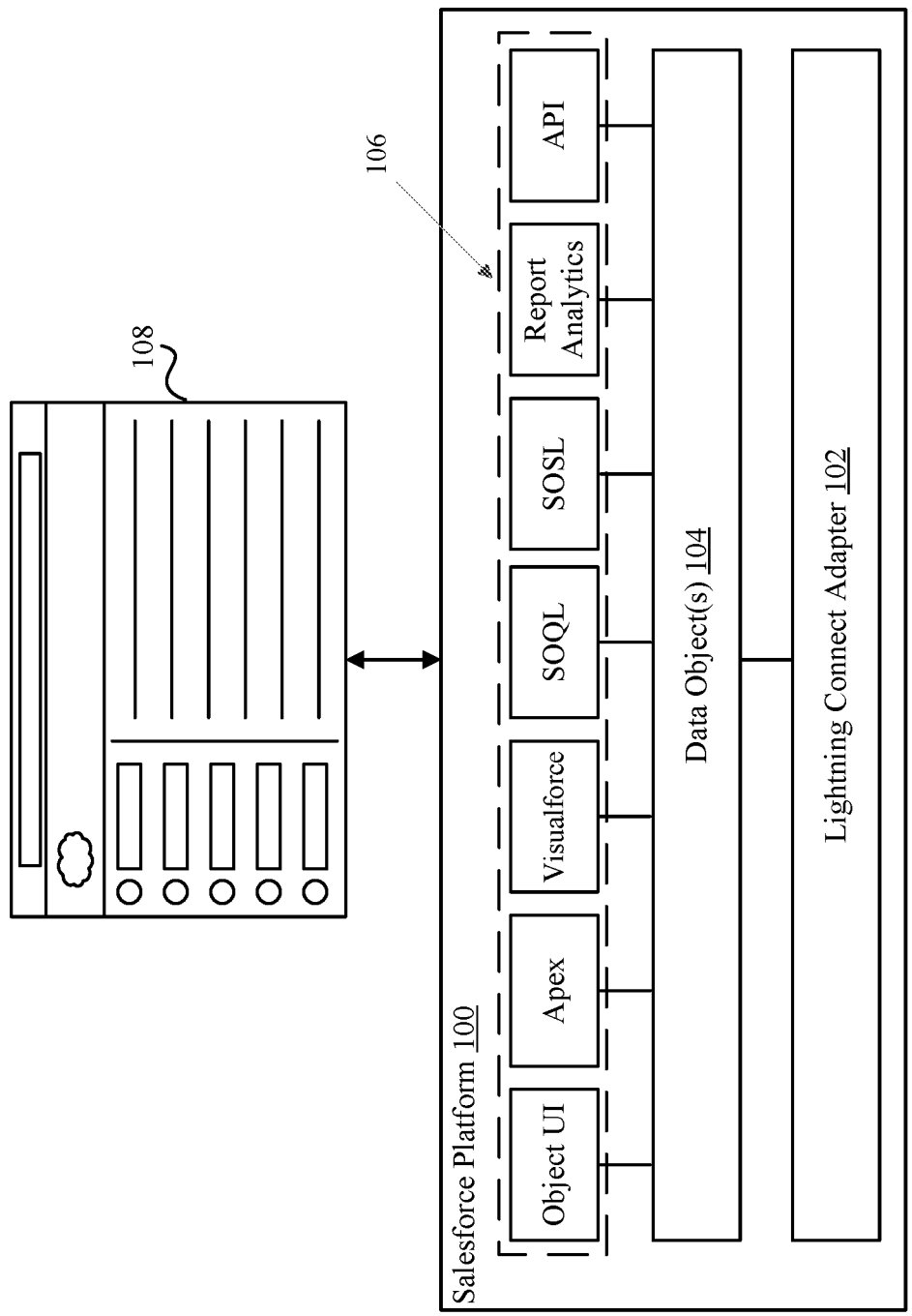
FIG. 1 depicts the various modules of a Salesforce platform that can be used to create and/or support a Salesforce interface.

Systems and techniques for implementing custom adapters for the Salesforce platform are described herein. More specifically, custom adapters can be developed for Lighting Connect that allow a Salesforce platform to be synchronized with an external service, such as the Google Sheets™ web-based spreadsheet program (also referred to herein as "Google Spreadsheets" or simply "Google Sheets"). Google Sheets is a web-based spreadsheet service that allows users to create and edit spreadsheets online with collaborating with other users in real time. Google Sheets may be accessible as a web application, as an offline application, and/or as a mobile application (e.g., for Android or iOS). The custom adapters can be used to read and write external data from a database associated with Google Sheets, and then continually reference the external data in order to provide a live view of the external data from a Salesforce interface.

Note that the term "Salesforce interface" is intended to cover any interface that allows a user to access a Salesforce environment. For example, a "Salesforce interface" could be a customer portal associated with Salesforce itself, or an interface associated with an add-on application to the Salesforce platform (e.g., a FinancialForce portal). The Salesforce interface could also be accessed via a Salesforce mobile application, enabled by the Salesforce Lightning Experience, etc.

The custom adapters for Lightning Connect allow the external data to be dynamically mapped to data object(s) that are used within a programming environment responsible for creating and/or supporting the Salesforce interface. Rather than copy the external data to an internal database (i.e., a database associated with the Salesforce platform), the custom adapters access and read/write the external data on demand and in real time. Thus, the custom adapters enable real-time, live data integration without data replication. Said another way, a user may be able to see modifications made to the external data (e.g., via a Google Sheets interface or the Salesforce interface) without experiencing significant lag. The term "significant lag" refers to lag that is substantially likely to influence the workflow of the user and does not include nominal lag that occurs due to the distributed nature of the network environment.

The custom adapters for Lightning Connect also allow multiple users to modify the external data substantially simultaneously without experiencing issues. For example, a first user could modify the external data via a Google Sheets interface, while a second user could modify the external data via a Salesforce interface. Both interfaces (i.e., the Google Sheets interface and the Salesforce interface) may be accessible via one or more of a web browser, mobile application, software program, or over-the-top (OTT) application. Accordingly, the interfaces may be accessed using any appropriate network-accessible electronic device, such as a mobile phone, tablet, personal computer, game console (e.g., Sony PlayStation or Microsoft Xbox), music player (e.g., Apple iPod Touch), wearable electronic device (e.g., a watch or fitness band), network-connected ("smart") device (e.g., television), virtual/augmented reality system (e.g., Oculus Rift or Microsoft Hololens), or some other electronic device.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import shall refer to this specification as a whole and not to any particular portions of this specification. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted by using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for some of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is intended to be illustrative only and is not intended to further limit the scope and meaning of the disclosure or of any exemplified term. Likewise, the disclosure is not limited to the various embodiments given in this specification.

System Overview

FIG. 1 depicts the various modules of a Salesforce platform 100 that can be used to create and/or support a Salesforce interface 108. The Salesforce platform 100 (which may also be referred to as a Salesforce environment or organization) can include a Lightning Connect adapter 102, one or more data objects 104, and one or more tools 106. Together, these components can be used to create and support a Salesforce interface 108 that is accessible to a user on an electronic device, such as a mobile phone, tablet, or personal computer. Other components could also be included as part of the Salesforce platform 100. For example, the Salesforce platform 100 could also include one or more internal databases.

A Lightning Connect adapter 102 allows the Salesforce platform 100 to access and read/write data from an external service and seamlessly integrate the data that is stored outside of the Salesforce platform 100. The Lightning Connect adapter 102 may access the external data while also continuing to access local data that is stored within the Salesforce platform 100. Oftentimes, the Lightning Connect adapter 102 is designed and developed to interface with a particular external service, such as Google Sheets. In such embodiments, the Lightning Connect adapter 102 can interface with the external service via one or more application programming interfaces (APIs) associated with the external service.

More specifically, the Lightning Connect adapter 102 can create a mapping of the external data to one or more data objects 104 used by the Salesforce platform 100. A "data object" can be a variable, data structure, or function that is usable within the programming environment of the Salesforce platform 100. The mapping enables the external data to be accessed on demand and in real time, rather than be copied over to the Salesforce platform 100. Thus, the Lightning Connect adapter 102 can virtualize the external data into data object(s) 104, which are readily usable by the Salesforce platform 100. Such a configuration ensures that the external data is never stale and that the Salesforce platform 100 will access only the external data necessary for a particular task.

Although the external data is not stored locally by the Salesforce platform 100, the Lightning Connect adapter 102 seamlessly interfaces and integrates with an external service, such as Google Sheets. The data object(s) 104 are available to tool(s) 106, such as global search programs, analytics reports, and record feeds. The data object(s) 104 may also be available for use within an Apex-based programming environment, Salesforce Object Search Language (SOSL) queries, Salesforce Object Query Language (SOQL) queries, APIs, and deployment via APIs, change sets, and packages. Apex is a proprietary Java-like programming language that can be used to create add-on applications for the Salesforce platform 100.

In some embodiments, the tool(s) 106 are responsible for creating and/or supporting a Salesforce interface 108 that is accessible to a user via an electronic device, such as a mobile phone, tablet, or personal computer. The Salesforce interface 108 could be used by a company for case management and task management, as well as for automatically routing and escalating important events. Alternatively, the Salesforce interface 108 could be used by a customer to track the status of individual cases or projects.

As further described below, the Salesforce interface 108 may support an additional functionality that is enabled by an add-on application executed by the Salesforce platform 100 within a programming environment. For example, a financial management application may allow a user (e.g., a company or a customer) to track and organize information related to accounting, billing, professional services automation (PSA), revenue recognition, human capital management (HCM), supply chain management (SCM), etc.

Each add-on application may also be described as a cloud-based solution that is developed for Force.com® (i.e., the PaaS that allows developers to create multitenant add-on applications that integrate into the main Salesforce platform 100). The add-on applications (also referred to as "Force applications" or "Salesforce applications") are typically built using Apex (a proprietary Java-like programming language) and/or Visualforce (a component-based user interface framework that includes a tag-based markup language similar to HTML).

Figure 2:
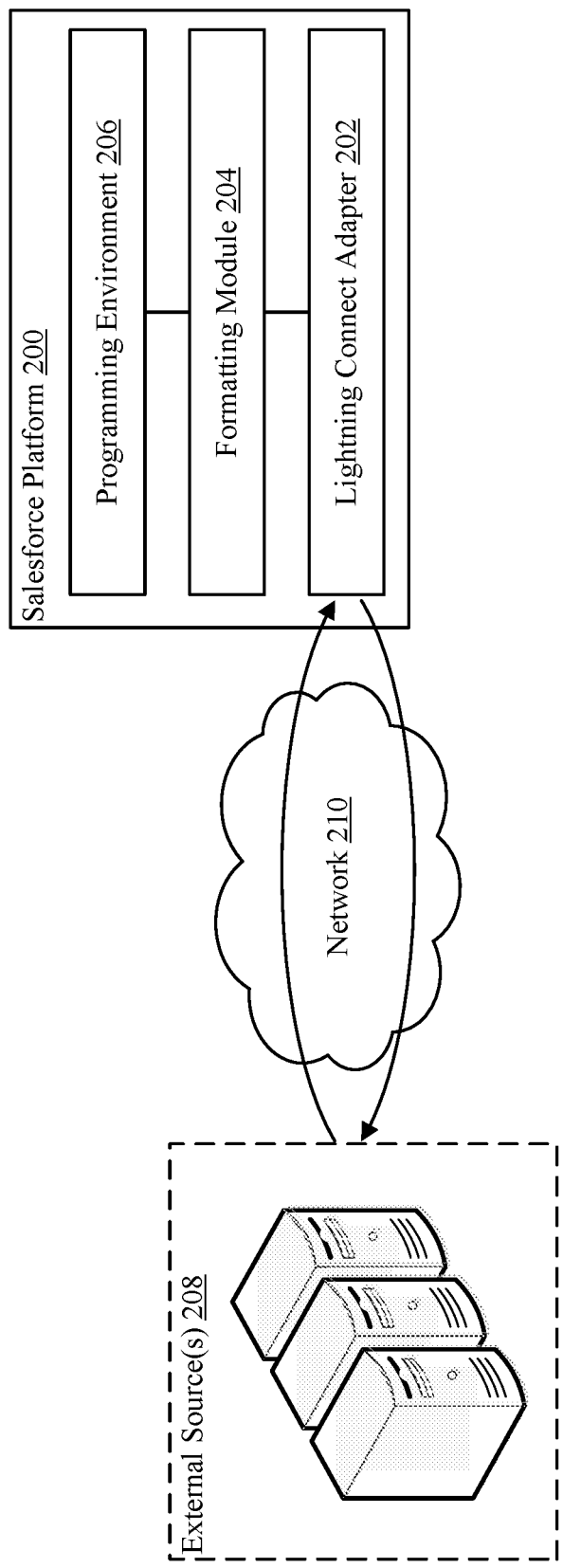
FIG. 2 depicts a high-level view of a network environment in which a Lighting Connect adapter of a Salesforce platform interfaces with one or more external source(s) of data.

FIG. 2 depicts a high-level view of a network environment in which a Lighting Connect adapter 202 of a Salesforce platform 200 interfaces with one or more external source(s) of data 208. The custom adapter for Lightning Connect allows the Salesforce platform 200 to interact with external data via one or more data objects that are used within a programming environment 206. The Salesforce platform 200 shown in FIG. 2 includes the Lightning Connect adapter 202, a formatting module 204, and a programming environment 206. Other embodiments of the Salesforce platform 200 may include some, all, or none of these modules and components, as well as other modules or components not shown here. Further yet, some embodiments may incorporate two or more of these modules into a single module and/or associate a portion of the functionality of one or more of these modules with a different module.

As noted above, the Lightning Connect adapter 202 can interface with the external data source(s) 208 so that external data can be integrated and used by the Salesforce platform 200. More specifically, the Lightning Connect adapter 202 can be programmatically coupled to a database associated with an external service (e.g., Google Sheets) via one or more APIs. The Lightning Connect adapter 202 and the API(s) allow the external data to be readily accessed across a network 210, such as the Internet, Bluetooth, a local area network (LAN), a wide area network (WAN), a point-to-point dial-up connection, etc. Note, however, that in some embodiments only HTTPS is supported as an outbound call from the Salesforce platform 200 where the Lightning Connect adapter 202 resides. Traditionally, data objects used within the programming environment 206 that are based on external data records (i.e., data records of an external service) have been read-only and could only be modified via an interface associated with the external service. However, the Lightning Connect adapter 202 makes the data objects writable, which means users can create, modify, or delete external data records from a Salesforce interface created by the Salesforce platform 200.

A formatting module 204, meanwhile, may be responsible for parsing the external data and formatting some or all of the external data so that it conforms to the specifications of the Salesforce platform 200. For example, the formatting module 204 could reformat or filter the external data before it is mapped to the data object(s) used within the programming environment 206. The programming environment 206 can include code that is associated with an add-on application for the Salesforce platform 200. The add-on application is typically responsible for enabling an additional functionality that is usable via a Salesforce interface. Because the add-on application is normally developed specifically for the Salesforce platform 200, the code within the programming environment 206 is generally written in Apex. However, other programming languages could also be used.

Unlike conventional add-on applications for the Salesforce platform 200, the custom Lightning Connect adapter 202 and formatting module 204 described herein eradicate the lag that typically encumbers data synchronization and enable a user of a Salesforce interface to experience real-time, live data integration without data replication.

Figure 3:
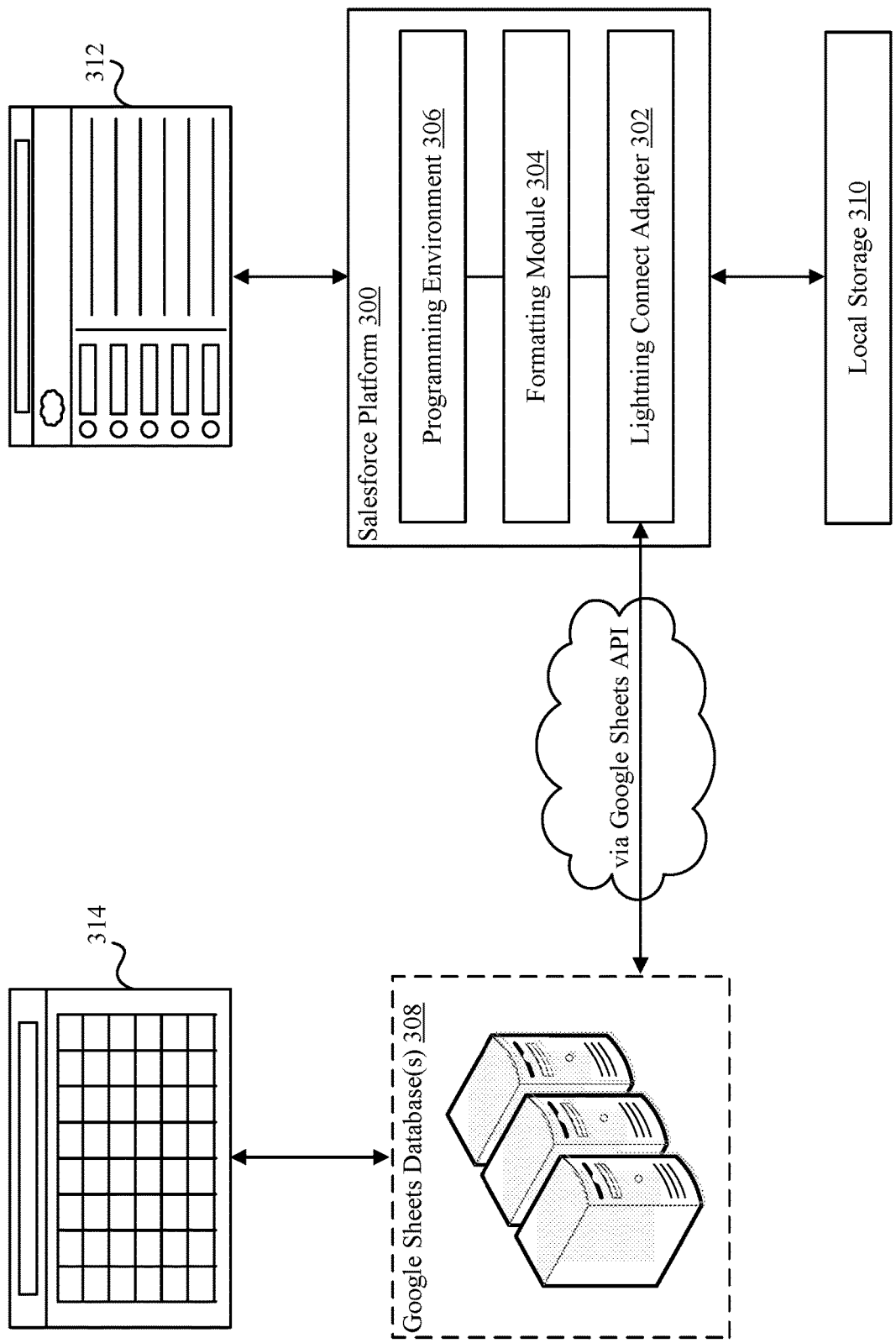
FIG. 3 depicts how a custom adapter for Lightning Connect can be used to seamlessly integrate one or more databases associated with Google Sheets and a Salesforce platform.

FIG. 3 depicts how a custom adapter 302 for Lightning Connect can be used to seamlessly integrate one or more databases 308 associated with Google Sheets and a Salesforce platform. More specifically, FIG. 3 illustrates the architecture needed to ensure that a Salesforce interface 312 and a Google Sheets interface 314 are each able to provide a live view of external data that is stored within the Google Sheets database(s) 308 and is synchronized across both services.

External data (e.g., data within the Google Sheets database(s) 308) is accessed in real time by invoking an external service (e.g., Google Sheets) directly from within the programming environment 306 of the Salesforce Platform 300. More specifically, a web service callout (e.g., an Apex Callout) can invoke an external web service utilizing Simple Object Access Protocol (SOAP-based) services or representational state transfer (REST) services and Web Services Description Language (WSDL) files, or Hypertext Transfer Protocol (HTTP) services (e.g., via a REST API).

For example, a call could initially be made to the Google Sheets API (also referred to as the "Google Spreadsheets API") from within the programming environment 306 that causes external data to be read and/or fetched from the Google Sheets database(s) 308. Alternatively, a call could be made to one or more other APIs that provide access to the raw data managed by the Google Sheets service. For example, a call could instead be placed to the Apps Script Execution API that can be used to expose the utility of any Google application. Calling the Google Sheets API causes a secure, stable connection to be established between the external service (here, Google Sheets via the Google Sheets API) and the Salesforce platform 300 (via the Lightning Connect adapter 302).

The Lightning Connect adapter 302 can then parse the external data in the Google Sheets Database(s) 308. Generally, this is done without copying the external data from the Google Sheets Database(s) 308. Consequently, the Salesforce platform 300 may perform live data integration without replicating the external data (and thus can eradicate the lag that typically accompanies such a resource-intensive process). However, in some embodiments, the Lightning Connect adapter 302 replicates some or all of the external data and stores the replicated data within a local storage 310 that is accessible to the Salesforce platform 300.

A formatting module 304 may be responsible for formatting the external data to ensure that it conforms to the specifications of the Salesforce platform 300. For example, the formatting module 304 could modify the data structure of dates, times, monetary amounts, etc., so that the external data can be properly identified by the Salesforce platform 300. The formatting module 304 can also establish a lookup relationship by mapping the external data to one or more data objects used within the programming environment 306. In some embodiments, the mapping is dynamically performed based on the content of the external data as recognized by the Lightning Connect adapter 302 and/or the formatting module 304. Thus, the mapping could be done cell-by-cell, rather than based on the row headers or the column headers of a spreadsheet.

After the external data has been mapped to the data object(s), the Google Sheets database(s) 308 and the programming environment 306 can be continually queried to determine whether a change has been made to the external data via a Google Sheets interface 314 or a Salesforce interface 316. Said another way, the external data can be continuously referenced in order to provide a live view of the external data in the Google Sheets database(s) 308 regardless of which interface is used to view the external data.

This is particularly advantageous in scenarios where multiple users are modifying the external data substantially simultaneously. For example, a first user could modify the external data via the Google Sheets interface 314, while a second user is modifying the external data via the Salesforce interface 312. The interface between the Google Sheets API and the custom adapter 302 for Lightning Connect enables the changes or edits to be viewed in real time across both environments.

Both interfaces (i.e., the Google Sheets interface 314 and the Salesforce interface 312) may be accessible via one or more of a web browser, mobile application, software program, or an OTT application. The data object(s) that are mapped to external data and backed by the Lightning Connect adapter may also be available to Salesforce APIs that can be used by the Salesforce platform to query, update, etc. Thus, access may not be limited to user interface (UI) access. Accordingly, the interfaces may be accessed using any appropriate network-accessible electronic device, such as a mobile phone, tablet, personal computer, game console (e.g., Sony PlayStation or Microsoft Xbox), music player (e.g., Apple iPod Touch), wearable electronic device (e.g., a watch or fitness band), network-connected ("smart") device (e.g., television), virtual/augmented reality system (e.g., Oculus Rift or Microsoft Hololens), or some other electronic device.

Note that in some embodiments the functionalities of multiple components described herein may be combined into a single component. For example, the custom adapter for Lightning Connect may be configured to format the external data and dynamically map the external data to the data object(s). Similarly, the functionality of a single component could be distributed amongst multiple sub-components that are not shown here.

Figure 4:
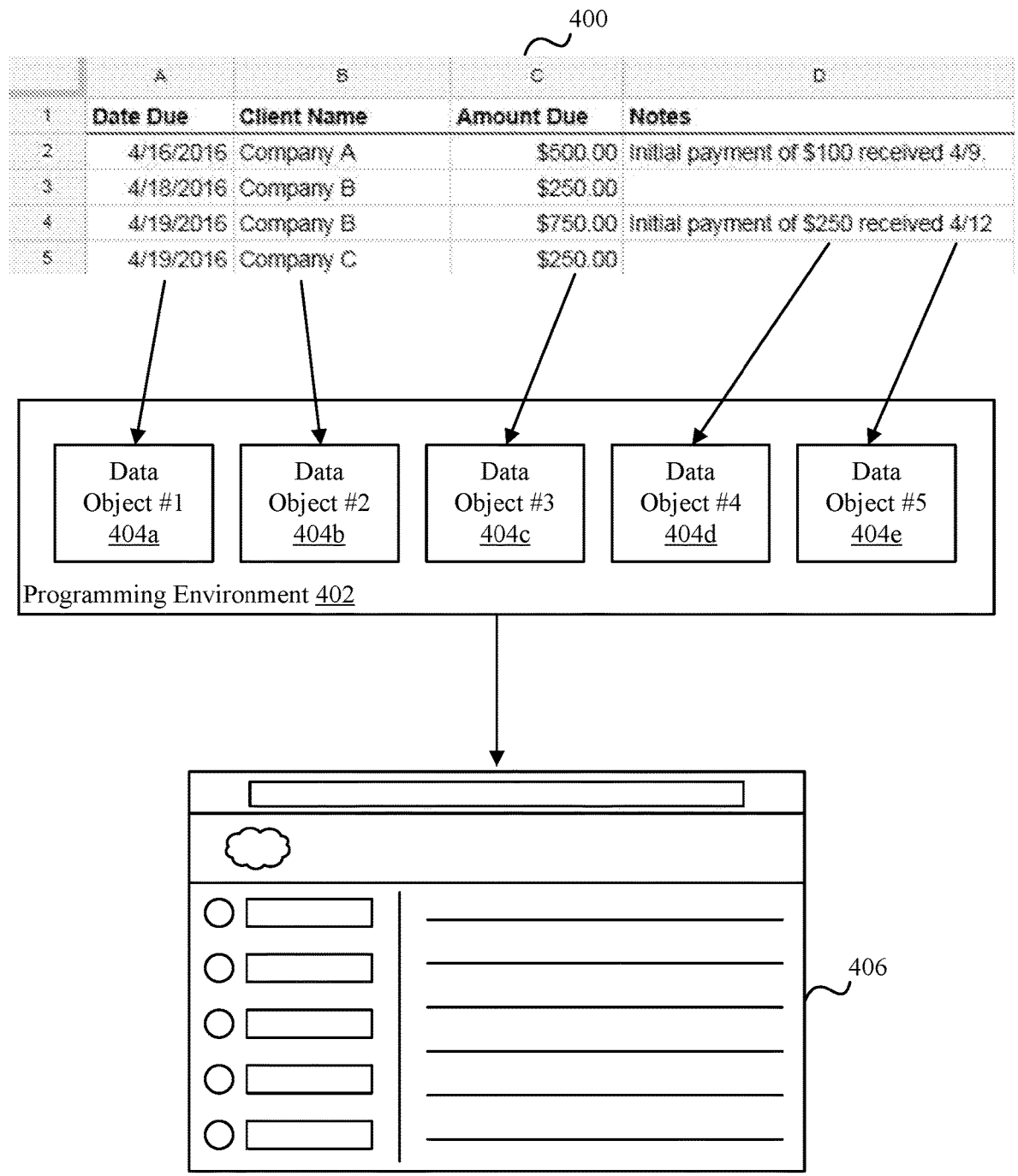
FIG. 4 illustrates how data from an external service, such as Google Sheets, can be parsed and dynamically mapped to data objects that are used to create and/or populate a Salesforce interface.

FIG. 4 illustrates how data from an external service, such as Google Sheets, can be parsed and dynamically mapped to data objects 404a-e that are used to create and/or populate a Salesforce interface 406. Oftentimes, users of the Salesforce interface 406 may store some or all of the data required by an add-on application (e.g., a financial management application) within a spreadsheet 400. This may occur due to numerous reasons. For example, a user may find that it is easier to track and manage data within the spreadsheet 400 or the user may have traditionally used spreadsheets to enter and store data.

The spreadsheet 400 (and, more specifically, the spreadsheet data within a database associated with the external service) can be accessed and read by a custom adapter for Lightning Connect that is usable by a Salesforce platform. The spreadsheet data can then be dynamically mapped to one or more data objects 404a-e that are used within a programming environment 402 that is responsible for creating and/or populating a Salesforce interface 406. Such a configuration enables the Salesforce platform to provide a live view of the spreadsheet data through the Salesforce interface 406 and post updates to the spreadsheet data in real time.

More specifically, the Salesforce platform can synchronously read spreadsheet data from one or more spreadsheets maintained by Google Sheets. The spreadsheet data can be automatically parsed to identify the content of the spreadsheet. In some embodiments, the spreadsheet data is parsed cell-by-cell to identify the content within individual cells, rather than parsing the row headers or the column headers of the spreadsheet. Here, for example, the spreadsheet data within cells D2 and D4 include multiple types of information (i.e., monetary amounts and dates) that are mapped to different data objects. Mapping the spreadsheet data to the data object(s) 404a-e allows the spreadsheet data to be turned into graphs, reports, etc., that are posted to the Salesforce interface 406. Moreover, since the spreadsheet data is read live by the custom adapter for Lightning Connect (typically in combination with at least one API, such as the Google Sheets API), the graphs, reports, etc., are updated in near real time as spreadsheet data is changed in the corresponding spreadsheet.

FIG. 5 depicts a process 500 for implementing a custom Lightning Connect adapter for a Salesforce platform. A programming environment associated with an add-on application for a Salesforce platform is initially accessed (e.g., by a developer or by a module of the add-on application) (step 501). The add-on application generally supports a new functionality that is usable by users of a Salesforce interface or improves an existing functionality. The new or improved functionality is enabled by one or more data objects that are used within the programming environment.

An API associated with an external service can be called from within the programming environment associated with the Salesforce platform (step 502). For example, a Google Sheets API can be called using a custom adapter for Lightning Connect that allows the Salesforce platform to readily interface with the Google Sheets service. Calling the API allows external data maintained by the external service to be accessed and read by the custom adapter for Lightning Connect without requiring the external data be copied into the programming environment. The external data can then be parsed by the Lightning Connect adapter after being read (step 503).

In some embodiments, the parsed external data is automatically formatted to ensure that the parsed external data read from the external service conforms to specifications of the Salesforce platform (step 504). The parsed external data could be formatted by the Lightning Connect adapter or a dedicated module (e.g., a formatting module of the Salesforce platform). Formatting may require that the parsed external data be changed into a particular format, be filtered to remove unnecessary data, etc.

The Lightning Connect adapter can then establish a relationship between the parsed external data and one or more data objects that are used within the programming environment (step 505). More specifically, the parsed external data can be dynamically mapped to the data object(s) based on the content of the external data as determined by the parsing (step 506). In some embodiments, the parsed external data is dynamically mapped to the data object(s) based on the content of individual cells within a spreadsheet. For example, the Lightning Connect adapter may determine that some cells contain multiple types of characters (e.g., numerical characters and alphabetic characters) that convey different information (e.g., monetary amounts received and dates the amounts were received). Oftentimes, it is preferable for the different types of information to be dynamically mapped to distinct data objects used within the programming environment.

The Lightning Connect adapter can then continually reference the external data and the data object(s) to synchronize the external service and the Salesforce platform (step 507). This enables the Salesforce interface to provide a live view of external data that is stored within a database of the external service. For example, the Salesforce interface may provide a live view of data within a Google Sheets database that is updated in real time. Said another way, the Salesforce interface could be immediately updated (e.g., using metadata generated by the Lightning Connect adapter responsive to determining a change was made to the external data) in response to a change being made to the external data via a Google Sheets interface. Similarly, the Google Sheets interface could be immediately updated (e.g., based on metadata received from the Lightning Connect adapter) in response to a change being made to the external data via the Salesforce interface. A "change" to the spreadsheet could be a modification of an existing data record (e.g., a cell, row, or column within the spreadsheet), deletion of an existing data record, or addition of a new data record.

FIG. 6 depicts a process 600 for synchronizing a Salesforce interface and an external interface (e.g., a Google Sheets interface). A custom adapter for Lightning Connect within a programming environment initially receives input indicative of a request to change an external data record that resides within a database of an external service (e.g., Google Sheets) (step 601). More specifically, the request can include a command to modify a data object that is used within the programming environment. The input corresponds to user input received at a Salesforce interface presented on the display of an electronic device (e.g., a mobile phone, tablet, or personal computer). The Salesforce interface may be accessible via one or more of a web browser, mobile application, software program, or over-the-top (OTT) application. The "change," meanwhile, could be a modification to an existing data record, the deletion of an existing data record, or the addition of a new data record.

A mapping of the data object(s) to the external data records of the external service can then be analyzed (step 602). The mapping can be used to identify the external data record of the external service and the corresponding data object that is used by a Salesforce platform (step 603). For example, a mapping of the data object(s) to a Google Sheets database can be analyzed to identify the external data record (e.g., cell, column, or row of a spreadsheet) and corresponding data object that are to be changed based on the user input received at the Salesforce interface. In some embodiments, the mapping represents a lookup relationship that is based at least in part on algorithmic logic that considers the content of individual cells within a spreadsheet maintained by the external service. The mapping could also include unique identifier values for some or all of the external data records maintained by the external service and some or all of the data object(s) used by the Salesforce platform.

Metadata indicative of the change made via the Salesforce interface can be transmitted from the Salesforce platform to the external service (e.g., Google Sheets) (step 604). More specifically, the metadata can be passed from the Salesforce platform to Google Sheets via a custom adapter for Lightning Connect that is programmatically coupled to one or more APIs (e.g., the Google Sheets API). Receipt of the metadata can cause the external service to update the external data record based on the metadata and reflect the change requested by the user at the Salesforce interface (step 605).

These steps can be repeated each time a change is made by the user via the Salesforce interface. Similarly, the Salesforce platform may be configured to receive metadata indicative of a change made to an external data record, identify the corresponding data object, and then modify the corresponding data object to reflect the change. For example, the Salesforce platform could receive metadata from Google Sheets (e.g., via a Google Sheets API) that prompts the custom adapter for Lightning Connect to make a change to a data object used by the Salesforce platform, thereby reflecting the change made via a Google Sheets interface. Consequently, the external data records of the external service and the data object(s) of the Salesforce platform can be automatically synchronized regardless of whether a change is made via an external service interface or a Salesforce interface.

Unless contrary to physical possibility, it is envisioned that the steps described above may be performed in various sequences and combinations. For instance, a user may choose to make changes to spreadsheet data using a Google Sheets interface, a Salesforce interface, or both. As another example, multiple users could make changes to the spreadsheet data substantially simultaneously using both the Google Sheets interface and the Salesforce interface (and thus metadata could be exchanged between the Salesforce platform and the Google Sheets service substantially simultaneously). Additional steps could also be included in some embodiments. For example, the Salesforce platform could create an index of changes made to the spreadsheet data using the Salesforce interface, the Google Sheets interface, or both.

Processing System

Figure 7:
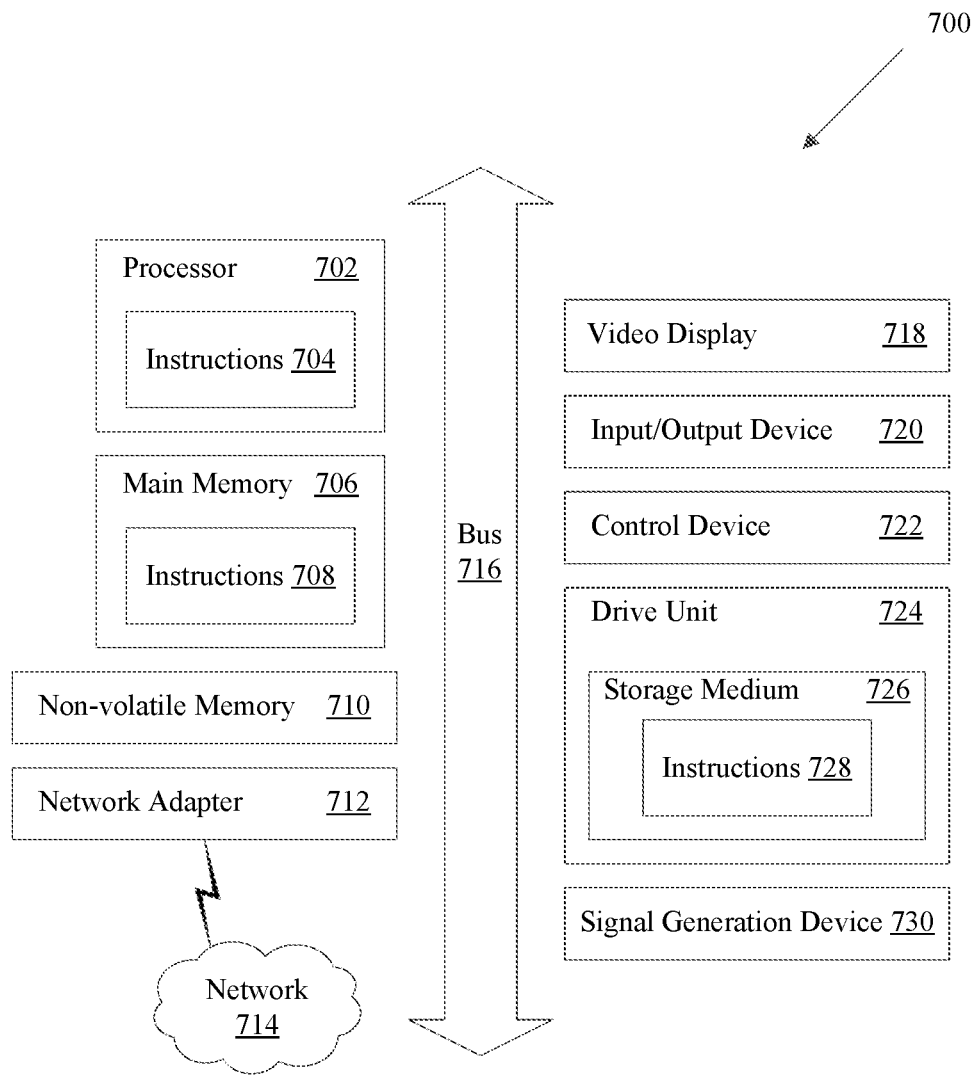
FIG. 7 is a block diagram illustrating an example of a processing system in which at least some operations described herein can be implemented.

FIG. 7 is a block diagram illustrating an example of a processing system 700 in which at least some operations described herein can be implemented. The computing system may include one or more central processing units ("processors") 702, main memory 706, non-volatile memory 710, network adapter 712 (e.g., network interfaces), video display 718, input/output devices 720, control device 722 (e.g., keyboard and pointing devices), drive unit 724 including a storage medium 726, and signal generation device 730 that are communicatively connected to a bus 716. The bus 716 is illustrated as an abstraction that represents any one or more separate physical buses, point to point connections, or both connected by appropriate bridges, adapters, or controllers. The bus 716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processing system 700 may operate as part of a Salesforce platform or a user device that is used to access the Google Sheets interface 314 or Salesforce interface 312 of FIG. 3. Alternatively, the processing system 700 could be connected (e.g., wired or wirelessly) to the Salesforce platform and/or the user device. In a networked deployment, the processing system 700 may operate in the capacity of a server or a client machine in a client-server network environment, or as a peer machine in a peer-to-peer (or distributed) network environment.

The processing system 700 may be a server computer, a client computer, a personal computer (PC), a tablet PC, a laptop computer, a personal digital assistant (PDA), a mobile telephone, an iPhone®, an iPad®, a Blackberry®, a processor, a telephone, a web appliance, a network router, switch or bridge, a console, a hand-held console, a gaming device, a music player, or any portable, device or any machine capable of executing a set of instructions (sequential or otherwise) that specify actions to be taken by the processing system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 704, 708, 728) set at various times in various memory and storage devices in a computer, and that, when read and executed by one or more processing units or processors 702, cause the processing system 700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 710, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 712 enables the processing system 700 to mediate data in a network 714 with an entity that is external to the processing system 700 through any known and/or convenient communications protocol supported by the processing system 700 and the external entity. The network adapter 712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A computer-implemented method comprising:
   receiving input indicative of a command to alter a data object used in a programming environment;
   examining a data structure that maps data objects used in the programming environment to external data records of an external database, wherein the external database is a Google Sheets database;
   formatting the external data records to conform to one or more data formats associated with a platform associated with the programming environment, wherein the platform is a Salesforce application development platform;
   parsing the external data records to identify one or more specifications associated with the platform, the external data records are parsed by calling an application program interface (API) associated with the external database within the programming environment, wherein the external data records are parsed without copying the external data records to an internal database of the platform;
   mapping the external data records according to the one or more specifications after the formatting and the parsing are performed, the external data records being mapped to the data object in the one or more data formats and according to the one or more specifications associated with the platform;
   identifying, based on the examining, a record of the external data records corresponding to the data object;
   transmitting metadata indicative of the command to the API, wherein receipt of the metadata causes the external database to formulate an instruction, the execution of which causes the identified data record to be altered; and
   synchronizing the external data records based on changes made to the data objects in real time without requiring an explicit synchronization request.

2. The computer-implemented method of claim 1, wherein the calling causes the external data records to be read from the Google Sheets database.

3. The computer-implemented method of claim 2, further comprising:
   formatting, based on the parsing, the external data records to ensure that the external data records read from the Google Sheets database conforms to a specification of the programming environment.

4. The computer-implemented method of claim 3, further comprising:
   creating the data structure by mapping the external data records to the data objects used in the programming environment.

5. The computer-implemented method of claim 1, further comprising:
   referencing the external data records of the external, database and the data objects in the programming environment on a continual basis, wherein the referencing enables a given record of the external data records in the Google Sheets database to be updated in near real time when a change is made to a corresponding data object of the one or more data objects via a Salesforce interface, and a given data object of the one or more data objects in the programming environment to be updated in near real time when a change is made to a corresponding external record of the external data records via a Google Sheets interface.

6. A non-transitory computer-readable medium with instructions stored thereon that, when executed by a processor, cause the processor to perform operations comprising:
   accessing a programming environment associated with a Salesforce application development platform;
   examining a data structure that maps external data records from a Google Sheets database to data objects used in the programming environment;
   formatting the external data records to ensure that the external data records conforms to one or more formats associated with the Salesforce application development platform;
   parsing the external records to identify a specification associated with the Salesforce application development platform, the external data records are parsed by calling an application program interface (API) associated with the Google Sheets database within the programming environment, wherein the external data records are parsed without copying the external data records to an internal database of the platform;
   establishing a lookup relationship by mapping the external data records to one or more data objects in the programming environment after the formatting and parsing are performed, the external data records being mapped to the one or more data objects in the one or more data formats and according to the specification associated with the Salesforce application development platform; and referencing the external data records in the Google Sheets database and the one or more data objects in the programming environment on a continual basis, wherein the referencing enables a given record of the external data records in the Google Sheets database to be updated in near real time when a change is made to a corresponding data object of the one or more data objects via a Salesforce interface, and a given data object of one or more data objects in the programming environment to be updated in near real time when a change is made to a corresponding external record of the external data records via a Google Sheets interface, wherein metadata indicative of a command associated with the change is transmitted to the API to cause the Google Sheets database to update the given record without an explicit synchronization request.

7. The non-transitory computer-readable medium of claim 6, wherein logic in the programming environment is implemented using an Apex programming language.

8. The non-transitory computer-readable medium of claim 6, wherein the reading is performed by a Lightning Connect adapter that is responsible for interfacing with the API.

9. The non-transitory computer-readable medium of claim 6, wherein the reading comprises:
analyzing the external data records to determine content of each cell of a spreadsheet that is represented by the external data records.

10. The non-transitory computer-readable medium of claim 9, wherein the lookup relationship is dynamically updated based on the content determined to be in each cell of the spreadsheet.

11. The non-transitory computer-readable medium of claim 6, wherein the referencing enables the Salesforce interface to present a live view of the external data records residing in the Google Sheets database.

12. The non-transitory computer-readable medium of claim 6, wherein the establishing is based on algorithmic logic that considers content of each cell of a spreadsheet that is represented by the external data records, rather than column headers or row headers.

13. The non-transitory computer-readable medium of claim 6, wherein the change associated with the external data records is the creation of a new data record, modification of an existing data record, or deletion of an existing data record.

14. An electronic device comprising:
a memory that includes instructions for synchronizing information across a customer relationship management (CRM) platform and an external service, wherein the instructions, when executed by a processor, cause the processor to:
access a programming environment associated with the CRM platform, wherein the CRM platform is a Salesforce application development platform;
connect an adapter associated with the CRM platform to an application programming interface (API) associated with the external service;
examine a data structure that maps external data records from an external database maintained by the external service to one or more data objects used in the programming environment, wherein the external database is a Google Sheets database;
format the external data records to conform to one or more data formats associated with the CRM platform;
parse the external data records to identify one or more specifications associated with the CRM platform, the external data records are parsed by the API within the programming environment, wherein the external data records are parsed without copying the external data records to an internal database of platform;
map the external data records to the one or more data objects, the external data records being mapped to the one or more data objects in the one or more data formats and according to the one or more specifications associated with the platform after the external data records being formatted and parsed; and
continually reference the external data records and the one or more data objects, wherein the continual referencing causes the external data records and the one or more data objects to be synchronized in near real time when a change is made to the one or more data objects or at least one of the external data records, wherein metadata indicative of a command associated with the change is transmitted to the API causing the external database to update the external data records without an explicit synchronization request.

15. The electronic device of claim 14, wherein the adapter is configured to produce a mapping that establishes a lookup relationship between the external data records and the one or more data objects.

16. The electronic device of claim 15, wherein the mapping includes a unique identifier value for each of the one or more data objects and each of the external data records.

17. The electronic device of claim 16, wherein each of the external data records represents content of a cell within a spreadsheet maintained by the external service.

* * * * *